United States Patent [19]
Hooberman

[11] Patent Number: 5,592,962
[45] Date of Patent: Jan. 14, 1997

[54] COMPRESSED GAS RELEASE SYSTEM

[75] Inventor: Gideon Hooberman, Haifa, Israel

[73] Assignee: G.O.T. Guide-On Technologies Ltd., Nesher, Israel

[21] Appl. No.: 523,480

[22] Filed: Sep. 5, 1995

[51] Int. Cl.$^6$ .................................................. F16K 17/36
[52] U.S. Cl. ........................ 137/68.22; 137/68.3; 137/81.2
[58] Field of Search ..................... 137/67, 81.2, 68.22, 137/68.3

[56] References Cited

U.S. PATENT DOCUMENTS

2,964,050 12/1960 Novok ........................................ 137/67
3,266,668 8/1966 Davis ...................................... 137/67 X Primary Examiner—John C. Fox
Attorney, Agent, or Firm—Mark M. Friedman

[57] ABSTRACT

A compressed gas release system including a compressed gas source, the gas within the source is released as a response to a combination of a predetermined threshold external pressure and a defined chemical environment. In particular, the compressed gas release system includes a housing defining a space; a material being in the space and being solid in a first chemical environment and the material dissolving in a second chemical environment; a biasing member being activated when pressed against the material when the material is solid and, the biasing member is relaxed when the material dissolves; a firing pin including a gas releasing end and, the firing pin being fired when the biasing member is relaxed; a source of compressed gas, the source of compressed gas releasing a gas when the firing pin is fired; a diaphragm having an internal side and an external side, the diaphragm being mounted onto the housing, the internal side of the diaphragm facing the space of the housing, thereby sealing the first chemical environment in the space; a diaphragm puncturing device mounted onto the housing; a pressure responding mechanism, the pressure responding mechanism keeping the internal side of the diaphragm away from the diaphragm puncturing device when the external pressure is below the threshold and, the diaphragm being punctured by the diaphragm puncturing device when the external pressure is above the threshold.

36 Claims, 4 Drawing Sheets

COMPRESSED GAS RELEASE SYSTEM

FIELD AND BACKGROUND OF THE INVENTION

The present invention relates to a compressed gas release system and, more particularly, to a device including a compressed gas source, the gas within the gas source is released as a response to a combination of a predetermined threshold external pressure and a defined chemical environment.

The compressed gas release system of the present invention may be used, for example, to operate a personal life saver device worn by a swimmer, a boater, a diver and the like. In this case the system is connected to an inflatable gas bag, the gas bag inflates as a response of the gas release system to a combination of a predetermined threshold water pressure and wetness (i.e., the chemical environment).

The compressed gas release system of the present invention may further be used, to operate a safety device deployed in various gas and liquid tanks. In this case the system is connected to a safety valve located at the tanks inlet, the gas within the compressed gas source is released as a response to a combination of a predetermined threshold external pressure and a defined chemical environment (e.g., oil), the gas released is operating the valve located at the tanks inlet.

In addition, the compressed gas release system of the present invention may be used to operate a mixing device used to mix one group of chemical reactants with an additional group of chemical reactants. In this case the compressed gas source contains the first group of chemical reactants, whereas the additional group of chemical reactants is contained in a second reservoir, such as, for example, an inflatable bag, the first group of chemical reactants is released to mix with the additional group of chemical components as the system responds to combination of a predetermined threshold external pressure and chemical environment. In this configuration, the compressed gas release system of the present invention may be used, for example to mix two groups of chemiluminescent reactants that produce light upon fixing, as in a light stick, which light may be employed in a beacon buoy.

Various types of water safety products were developed over the years. These include foam vest jackets, inflatable "toys" (e.g., inflatable rings, arm cuffs and other floatation devices) which are inflated either orally or with a pump aid prior to use and, inflatable personal flotation devices (IPFDs).

Figure 1A:
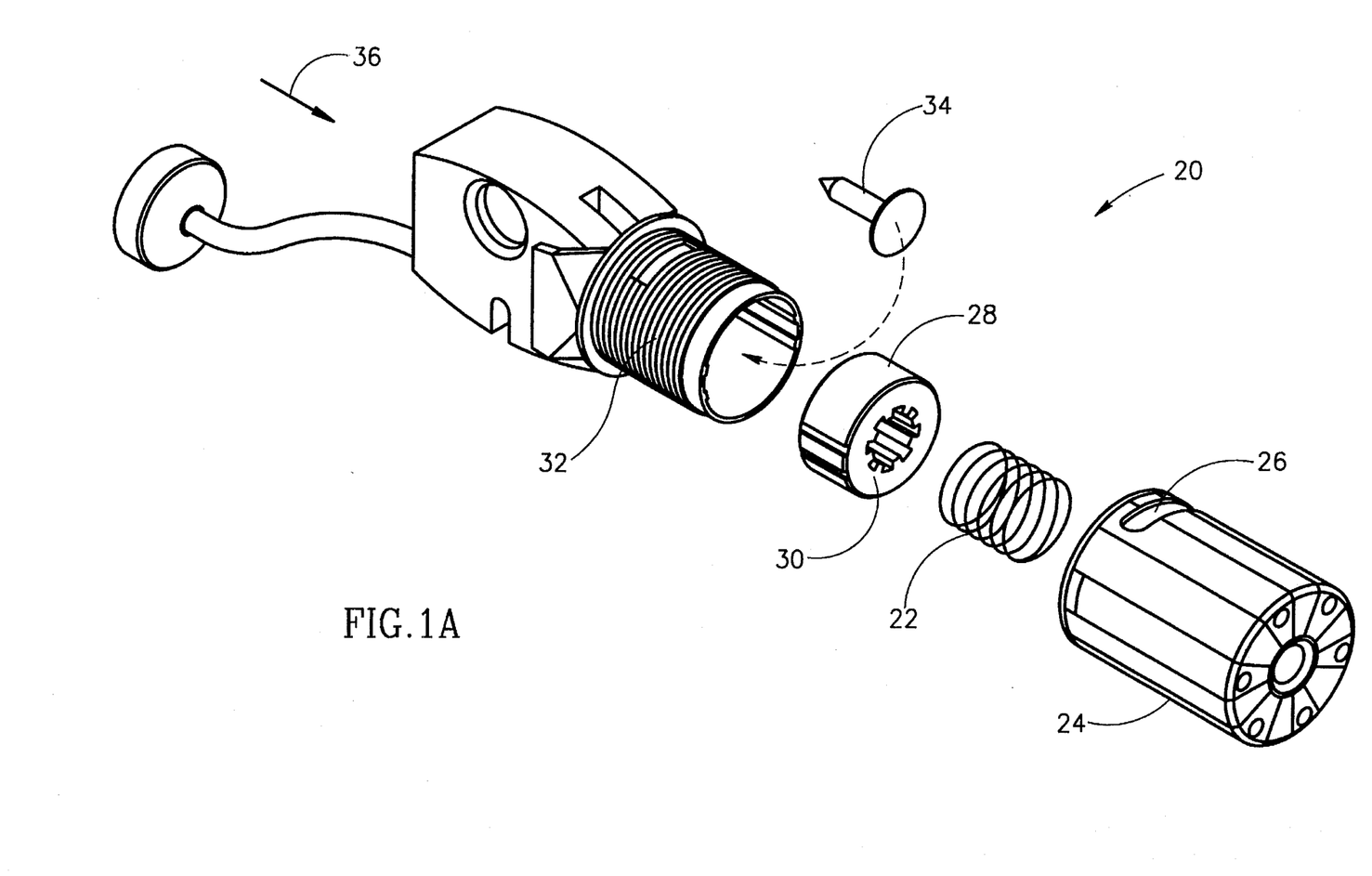
FIGS. 1a and 1b are a perspective view of an IPFDs gas release system of the prior art responding only to a predefined chemical environment.
Figure 1B:
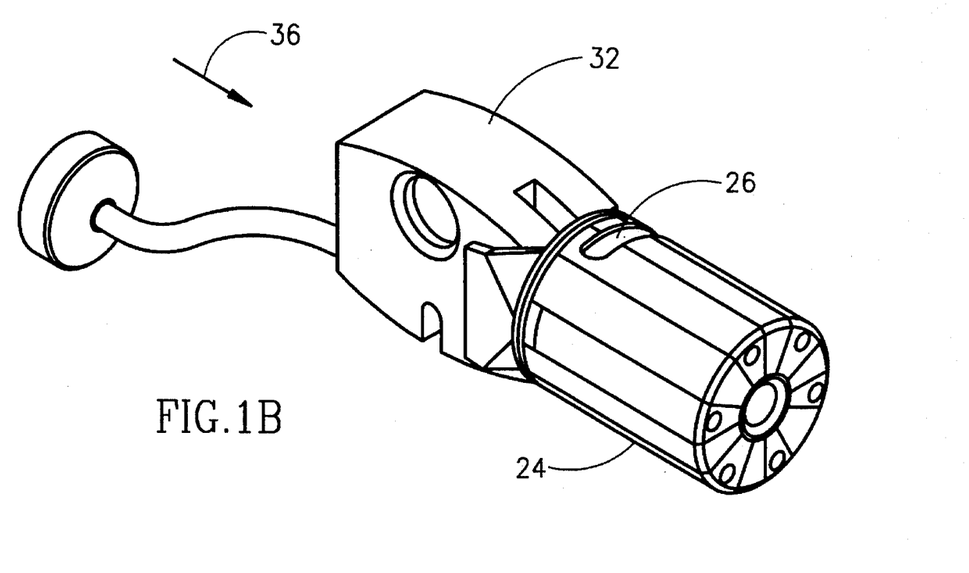

IPFDs are inflated from a self contained gas source. As shown in FIG. 1a, an IPFDs gas release system 20 includes a spring 22 contained in an internally threaded cap 24 having water passage holes 26. System 20 further includes a hollowed ring 28 containing a water dissolvable material 30, typically a mixture of gypsum and salt and, an externally threaded housing 32, which housing 32 includes a firing pin 34 and is suitable to connect to a gas source from direction 36. As shown in FIG. 1b, when system 20 is assembled, spring 22 is compressed against material 30 and is, therefore, activated. When, in its assembled state, system 20 becomes in contact with water, material 30 dissolves and, therefore, activated spring 22 presses firing pin 34 against the gas source and activates it to release the compressed gas. The gas thus released inflates the IPFDs.

Nevertheless, each of the above described water safety products have one or more drawbacks. Foam vest jackets and inflatable "toys" are always containing a floating material when used and, therefore, are (1) uncomfortable when worn out of water (e.g., during a sale on a boat); and (2) provide a constant floating aid when used in water and, therefore, can not be used as a floating device operative only under life threatening circumstances (i.e., drowning). IPFDs, on the other hand, do not contain a floating material when are in use in a dry environment (e.g., on a boat), therefore, IPFDs may be constructed such that they will not have the drawback under (1) above. Nevertheless, the IPFDs gas release system, as shown in FIGS. 1a–b and detailed above, is operated instantly when it becomes in contact with water and, therefore, IPFDs do suffer from the drawback under (2) above.

Beacon buoys are used as a location marking device in sea. Beacon buoys typically include a light source operated by electricity, a battery supplying the electricity and, means for floatation. When the beacon buoy is in a dry environment, the electrical circuit connecting the light source with the battery is disconnected. When the beacon buoy is immersed in water, the electrical circuit closes and the light source becomes operated. However, such a device is dependent upon an electrical energy source (e.g., a battery) which tends to lose operability with time and, therefore, requires a periodic maintenance and/or replacement. Nevertheless, the compressed gas release system of the present invention, when employed to operate a mixing device used to mix one group of chemical reactants with an additional group of chemical reactants, to produce chemiluminescent reaction that produces light is not dependent upon an electrical energy source, rather it depends directly upon a chemical energy source and, therefore, do not require maintenance.

There is thus a widely recognized need for, ant it would be highly advantageous to have, a compressed gas release system devoid of the above mentioned limitations, which system is suitable to release gas from a gas source as a response to a combination of a predetermined threshold external pressure and a defined chemical environment.

SUMMARY OF THE INVENTION

According to the present invention there is provided a compressed gas release system including a compressed gas source, the gas within the source is released as a response to a combination of a predetermined threshold external pressure and a defined chemical environment.

According to further features in preferred embodiments of the invention described below, the compressed gas release system includes (a) a housing defining a space; (b) a material being in he space and being solid in a first chemical environment and the material dissolving in a second chemical environment; (c) a biasing member being activated when pressed against the material when the material is solid and, the biasing member is relaxed when the material dissolves; (d) a firing pin including a gas releasing end and, the firing pin being fired when the biasing member is relaxed; (e) a source of compressed gas, the source of compressed gas releasing a gas when the firing pin is fired; (f) a diaphragm having an internal side and an external side, the diaphragm being mounted onto the housing, the internal side of the diaphragm facing the space of the housing, thereby sealing the first chemical environment in the space; (g) a diaphragm puncturing device mounted onto the housing; (h) a pressure responding means, the pressure responding means keeping the internal side of the diaphragm away from the diaphragm puncturing device when the external pressure is below the threshold and, the diaphragm being punctured by the diaphragm puncturing device when the external pressure is above the threshold; the housing, the space, the biasing member, the material, the pressure responding means, the firing pin, the gas releasing end, the diaphragm and the diaphragm puncturing device being arranged so that when the diaphragm is punctured by the diaphragm puncturing device, the space is exposed to the second chemical environment, the material dissolves, the biasing member is relaxed, the firing pin is fired along with the gas releasing end and, as a result, the gas is released from the source of compressed gas.

According to still further features in the described preferred embodiments the pressure responding means is selected from the group of means consisting of a biasing device, an internal pressure within the housing and a combination of a biasing device and an internal pressure within the housing.

According to still further features in the described preferred embodiments the biasing device is a first spring.

According to still further features in the described preferred embodiments the biasing member is a second spring.

According to still further features in the described preferred embodiments the pressure responding means is a first spring and the biasing member is a second spring.

According to still further features in the described preferred embodiments the compressed gas release system further includes a gas bag, the gas bag being in communication with the gas source under the combination of threshold pressure and chemical environment.

According to still further features in the described preferred embodiments the gas bag further includes a first group of chemiluminescent materials and the gas source includes a second group of chemiluminescent materials, the first and second groups of chemiluminescent materials being mixed under the combination of threshold pressure and chemical environment.

According to still further features in the described preferred embodiments the gas bag is for floating a person above water.

According to still further features in the described preferred embodiments the gas operates a valve operating device, the valve operating device closing a valve located in an inlet of a tank.

According to still further features in the described preferred embodiments the biasing member surrounds at least a part of the firing pin.

According to still further features in the described preferred embodiments the biasing member is external to the firing pin.

According to still further features in the described preferred embodiments the gas is selected from the group consisting of air, nitrogen, oxygen, freon, carbon dioxide, helium, nitrous oxide, propane, sulfur hexafluoride and, any combinations of air, nitrogen, oxygen, freon, carbon dioxide, helium, nitrous oxide, propane and sulfur hexafluoride.

According to still further features in the described preferred embodiments the gas is in a liquid form when is in the gas source.

According to still further features in the described preferred embodiments the diaphragm is made of a material selected from the group of materials consisting of rubber, plastic, silicone, synthetic polymers, natural polymers and, any combination of rubber, plastic, silicone, synthetic polymers and natural polymers.

According to still further features in the described preferred embodiments the compressed gas release system further includes a cover, the cover including holes and the cover protecting the diaphragm.

According to still further features in the described preferred embodiments the biasing member is embedded in the material.

According to still further features in the described preferred embodiments the internal pressure within the housing is programmable.

According to still further features in the described preferred embodiments the diaphragm puncturing device is movable relative to the internal side of the diaphragm.

According to still further features in the described preferred embodiments the compressed gas release system further includes a handle connected to the system for manual operation of the system.

According to still further features in the described preferred embodiments the material is selected from the group of materials consisting of gypsum, salt, clay, and any combination of gypsum, salt and clay.

According to still further features in the described preferred embodiments gas releasing end of the firing pin is selected from the group consisting of a pointed gas releasing end, a sharp gas releasing end and a large gas releasing end.

The present invention successfully addresses the shortcomings of the presently known configurations by providing a gas release system activated by a combination of a predetermined external threshold pressure and chemical environment.

The present invention discloses a novel compressed gas release system including a compressed gas source, the gas within the source is released as a response to a combination of a predetermined threshold external pressure and a defined chemical environment, which system may be used to operate a personal life saver device worn by a swimmer, a boater, a diver and the like; to operate a safety device deployed in various gas and liquid tanks; and to operate a device aimed at mixing two groups of chemical reactants, the system operates these devices only under predetermined conditions of pressure and chemical environment.

BRIEF DESCRIPTION OF THE DRAWINGS

The invention herein described, by way of example only, with reference to the accompanying drawings, wherein.

DESCRIPTION OF THE PREFERRED EMBODIMENTS

The present invention is of a compressed gas release system which can be used to release compressed gas from a gas source as a response to a combination of a predetermined threshold external pressure and a defined chemical environment. Specifically, the present invention can be used to operate (1) a personal life saver device including an inflatable gas bag, the gas bag inflates as a response of the gas release system of the present invention to a combination of a predetermined threshold water pressure and wetness (i.e., the chemical environment); (2) a safer device deployed in various gas and liquid tanks, the device which includes a valve is connected to the tanks inlet, the gas within the compressed gas source is released as the gas release system responds to a combination of a predetermined threshold external pressure and a defined chemical environment (e.g., oil), the gas released is forcing the valve to close the tanks inlet; and (3) a mixing device used to mix one group of chemical reactants (e.g., a first group of chemiluminescent reactants) contained in the compressed gas source with an additional group of chemical reactants (e.g., a second group of chemiluminescent reactants) contained in a second reservoir, the mixing device operates as the system responds to a combination of a predetermined threshold external pressure and chemical environment.

The principles and operation of a compressed gas release system according to the present invention may be better understood with reference to the drawings and accompanying descriptions.

Referring now to the drawings, the compressed gas release system of the present invention, generally marked as 48, includes two responding mechanisms: an external pressure responding mechanism and, a chemical environment responding mechanism.

Figure 2A:
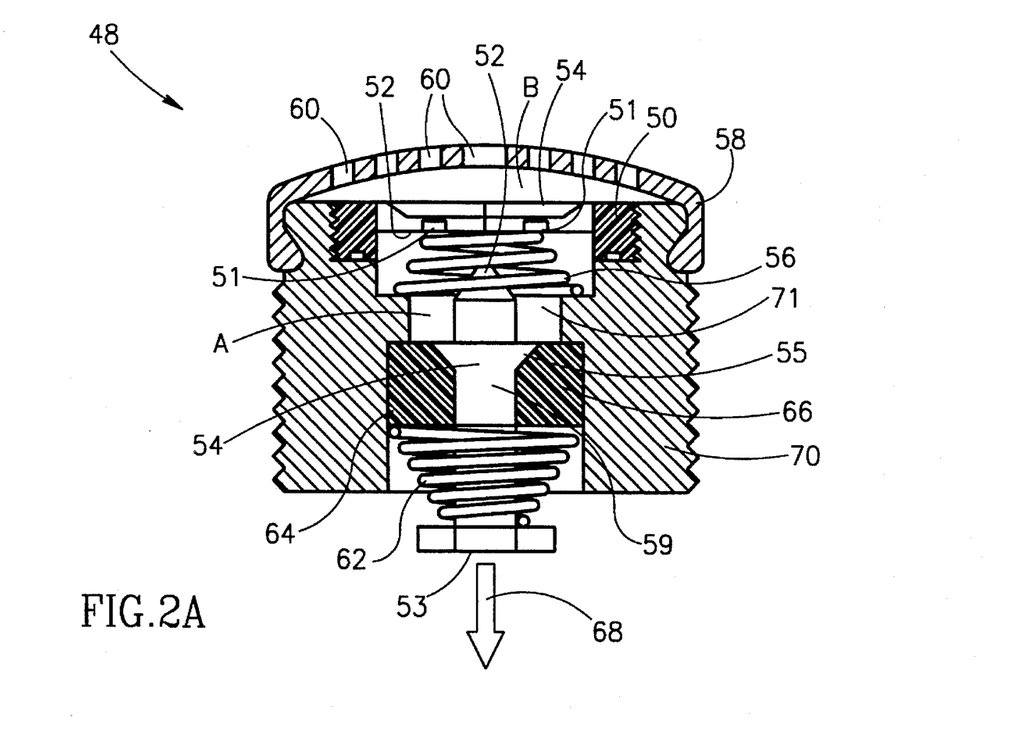
FIGS. 2a and 2b are cross sections of the compressed gas release system according to the present invention.
Figure 2B:
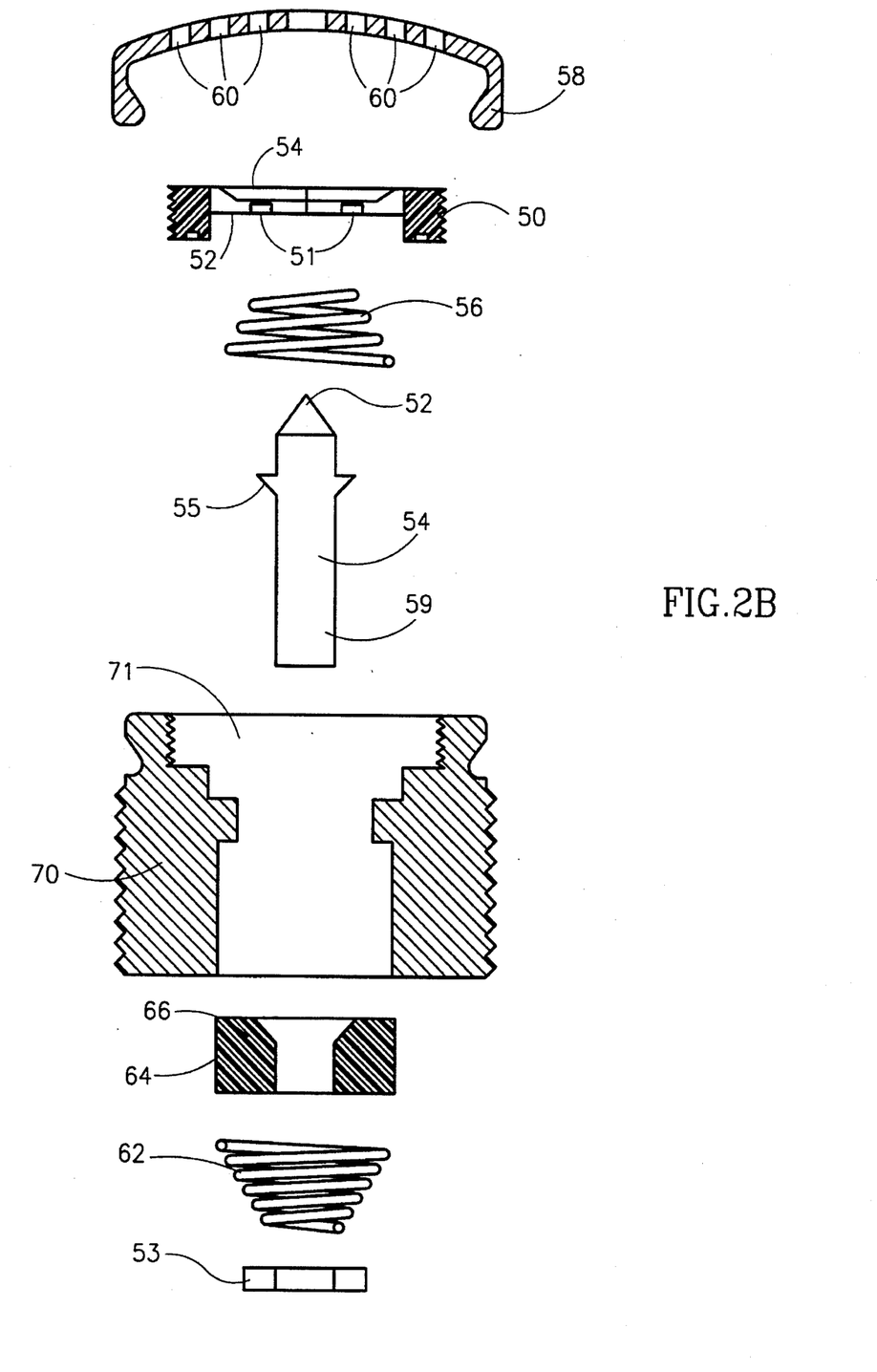

As shown in FIGS. 2a and 2b, the external pressure responding mechanism includes a housing 70 defining a space 71. Space 71 is sealed with a diaphragm 50 having an internal side 52 and an external side 54. Diaphragm 50 is located away from a diaphragm puncturing device 52 by a pressure responding means, such as a biasing device 56, a spring in the example given in FIGS. 2a–b. In this case diaphragm 50 may include a diaphragm protecting ring 51 made of a hard material, such as plastic, directing the biasing device 56 (e.g., the spring) to its place and protecting diaphragm 50 from accidentally being punctured by biasing device 56 itself. Nevertheless, it is understood to those with skills in the art that alternatively or additionally to the biasing device (e.g., spring 56), systems 48 internal pressure, as measured, for example, at point A, in FIG. 2a, located in space 71, may be employed as the pressure responding means. In this case, a cover 58 including holes 60 is keeping diaphragm 50 in place when the pressure at point A is higher than the external pressure measured, for example, at point B. In both case, when the external pressure B is above a predetermined threshold pressure, diaphragm 50 will be punctured by the diaphragm puncturing device 52.

It is understood that various parameters in the above described system 48 may be altered to determine the external threshold pressure in which diaphragm 50 will be punctured. These include, for example, (1) various parameters associated with diaphragm 50 itself such as, but not limited to, its diameter, material of make, thickness, etc., (2) spring selection; (3) internal pressure selection; and (4) selecting the distance between the inner side 52 of diaphragm 50 and the diaphragm puncturing device 52. It is further understood that some of the above listed parameters may be constant parameters for a given system 48, yet other parameters, such as, for example, the internal pressure and, the distance between the inner side 52 of diaphragm 50 and the diaphragm puncturing device 52 may be adjustable, resulting in a programmable system as to its external threshold pressure response.

The chemical environment responding mechanism of the compressed gas release system of the present invention is similar, yet more compact relative to the one shown in FIG. 1 and described above.

As further shown in FIGS. 2a–b, the chemical environment responding mechanism includes a biasing member 62, such as a spring. Biasing member 62 is pressed (i.e., activated) between a chemical environment responding material 66, and a firing pin 54. Material 66 is selected to be solid in a first chemical environment and to dissolve when exposed to a second chemical environment. For example if material 66 is gypsum mixed with salt, it is very resistant to press applied to it under dry conditions (i.e., the first chemical environment) but quickly dissolves when contacted with water (i.e., the second chemical environment). Material 66 may be contained in a hollowed member 64. When material 66 dissolves as explained hereinabove, biasing member 62 relaxes, firing pin 54 is fired and as a result, gas is release from a compressed gas source (not shown). Several arrangements of material 66, firing pin 54 and biasing member 62 are possible. In the example shown in FIGS. 2a–b, firing pin 54 includes a gas releasing end 53 and a cleat 55 which is embedded in material 66 as long as it is in its solid state for keeping spring 62 activated as long as material 66 has not dissolved. If system 48 is exposed to an external pressure above the threshold and, therefore, diaphragm 50 is punctured, the external chemical environment (i.e., the second chemical environment) is replacing the internal chemical environment (i.e., the first chemical environment), material 66 dissolves and firing pine 54 is forced (by the energy released from biasing member 62) to move in a direction indicated in FIG. 2a by arrow 68 and as a result, the gas source is activated to release its compressed gas. On the other hand, if the external pressure is lower than the threshold pressure of system 48, diaphragm 50 is intact and, non of the above description occurs since housing 70 and diaphragm 50, are protecting material 66 from encountering the second chemical environment.

Other arrangements of material 66, firing pin 54 and biasing member 62 may, for example be: (1) biasing member 62 is located externally to firing pin 54 rather than engulfing it (as shown in FIG. 1) or, (2) biasing member 62 is fully or partially embedded in its activated form in material 66, while functioning similarly. In both cases, as material 66 dissolves, firing pin 54 is fired and gas is released as explained hereinabove.

As further shown in FIGS. 2a–b, diaphragm 52 and firing pin 54 may be combined to a single element 59. In so, he configurations gas release end 53, may also be a part of element 59.

As is understood to those with skills in the art, gas releasing end 53 may acquire various forms depending on the nature of the compressed gas source. Presently it is preferred that gas releasing and 53 will directly release the gas from the compressed gas source by either pushing the gas source (in this case a flat gas releasing end 53, as the one shown in FIGS. 2a–b is preferably employed) or by puncturing the gas source (in this case a pointed gas releasing end (not shown) is preferably employed. Alternatively, the movement of firing pin 54 may function indirectly by operating a mechanism, itself bringing about the release of the gas from the gas source.

Figure 3A:
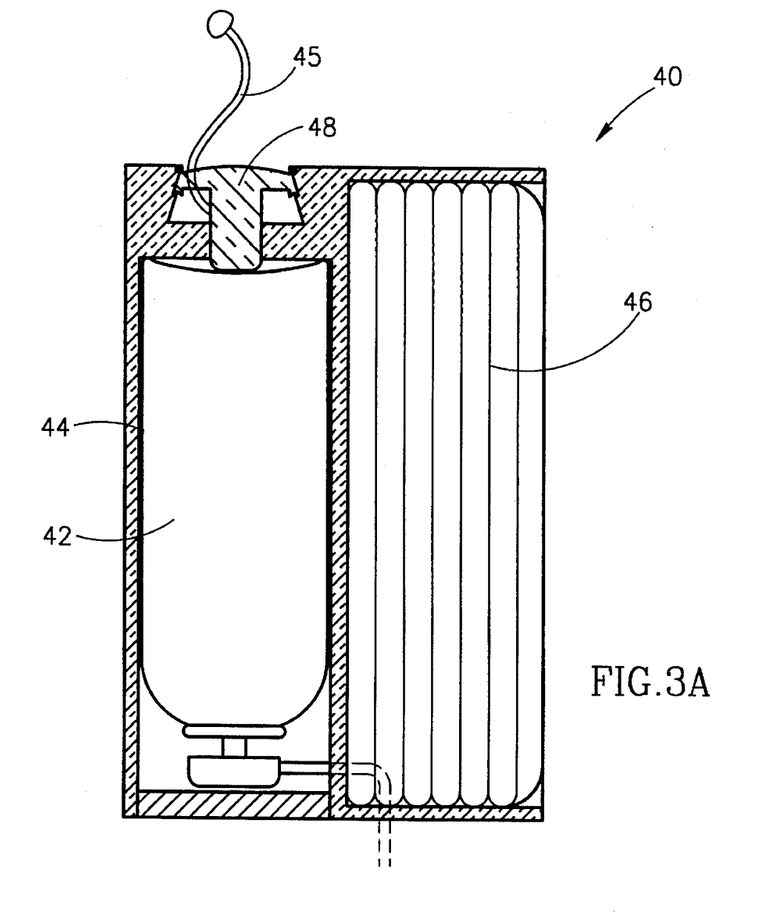
FIGS. 3a and 3b are a general cross section view of devices operated by the compressed gas release system according to the present invention.

FIG. 3a is a general illustration of a personal life saver device 40 including a compressed gas 42 contained in a gas source 44, a gas canister in the example given in FIG. 3a, a gas bag 46 (shown in FIG. 3a in its folded position) and, a compressed gas release system 48, as described herein above. When the personal life saver device 40 is exposed to a predetermined threshold water pressure, the compressed gas release system 48 operates gas source 44 to release the compressed gas 42 into gas bag 46 and, therefore, inflates it.

A personal life saver device operated by the compressed gas release system 48 of the present invention, addresses the limitations of the presently known configuration by providing a device which can be manufactured sized small and, therefore, comfortable to a wearer. Furthermore, a personal life saver device operated by system 48 can be manufactured to provide a floatation means only when the external pressure exceeds a predetermined threshold pressure such as when the wearer sinks underwater. Thus a personal life saver device operated by system 48 can be worn by swimmers, boaters, divers and the like involved in water sports or occupations and provide a protection from drowning, which protection is more comfortable than the presently known configurations and is operating only under life threatening situations.

Still referring to FIG. 3a, if gas source 44 contains a first group of chemiluminescent reactants and, gas bag 46 contains a second group of chemiluminescent reactants, the first and the second groups of chemiluminescent reactants are of a single chemiluminescent reaction, than device 40 can be used to mix these reactants as a response to a combination of a predetermined threshold external pressure and chemical environment and, to ignite the chemiluminescent reaction, therefore, to produce light.

Such a mixing device of chemiluminescent reactants may, for example, serve as a beacon buoy used as a location device in sea. In this case, gas bag 44 is made of a light transparent material. When a beacon buoy operated by the gas release system of the present invention is thrown into water, it first sinks to a depth characterized by a pressure higher than the threshold pressure, to operate gas release according to the principals described hereinabove and, than, the gas containing the first group of chemiluminescent reactants is released to the gas bag containing the second group of chemiluminescent reactants. As a consequence (1) the gas bag inflates and the beacon buoy floats above water; and (2) a light producing chemiluminescent reaction is ignited within the gas bag. Beacon buoy operated according to the described above has few advantages relative to the presently known configurations. First, it does not lose power as batteries does and, therefore, does not require periodic maintenance. Second, such a beacon buoy is not sensitive to wetness if not accompanied by a pressure above the pressure required to activate the compressed gas release system. Third, a beacon buoy thus operated may be manufactured sized as small as a tennis ball or less, is relatively light, yet when operated may produce a relatively big light ball (e.g., 50–100 cm in diameter or more), which light ball is detected from far.

Figure 3B:
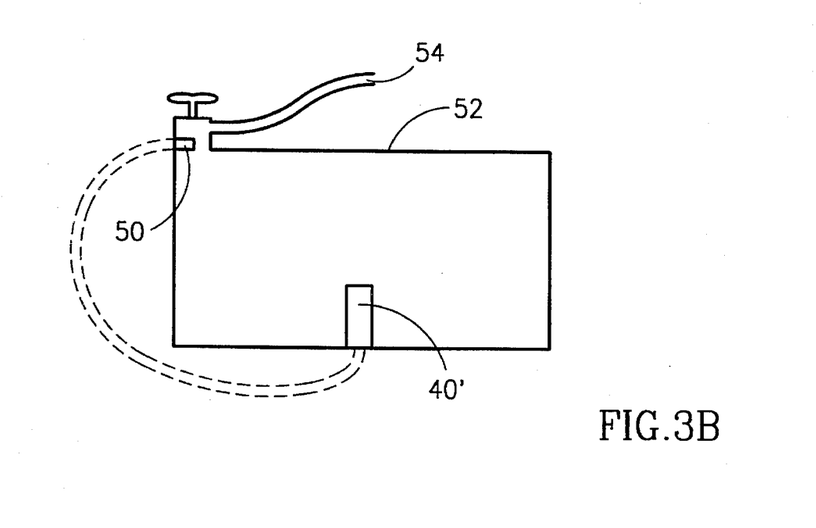

Referring now to FIG. 3b, if gas source 44 is connected, alternatively to gas bag 46, to a safety valve 50 located at a tanks 52 inlet 54, than device 40, omitted of gas bag 46 (device 40'), can be used as a safety device to prevent a rise of pressure above a predetermined threshold in tank 52, by closing valve 54. The compressed gas release system 48 of the present invention can thus be used to operate a safety device deployed in various gas and liquid tanks, the device operates to limit the pressure builds in the tank. In this application the material against which the biased member is pressed, is selected to be sensitive to what ever substance is loaded in the tank.

Yet, in these three exemplified applications of the compressed gas release system of the present invention, the system may additionally be connected to a handle 45, handle 45 operating gas source 44 to release its compressed gas 42, independent of the external pressure and/or the chemical environment.

According to the present invention, any gas may be selected to be contained in the gas source. Examples include air, nitrogen, oxygen, freon, carbon dioxide, helium, nitrous oxide, propane, sulfur hexafluoride and, combinations thereof. Preferably, (1) the gas selected liquidates when compressed to 5–15 atmospheres, in room temperature; (2) the gas is not hazardous (e.g., flammable or poisonous); and (3) the gas is environment (e.g., ozone) friendly. Chemical reactants, such as chemiluminescent reactants may be added to the gas provided that the gas does not chemically interact with these reactants in a way that would inhibit a chemiluminescent reaction in which these reactants participate.

Further according to the present invention, the diaphragm may be made in different sizes and shapes and from any elastic material. Examples include rubber, plastic, silicone, synthetic polymers, natural polymers and combinations thereof.

Yet further according to the present invention, the material against which the biasing member is pressed may be of various substances characterized by being solid in one chemical environment, and dissolving in another, depending on the specific application. If the dissolving environment is water, suitable substances include, but are not limited to, salt, clay and combinations thereof.

It should be noted that when the term 'dissolving' is used herein and, in the claims, with respect to the material, it refers also to any other physical and/or chemical reaction(s) that the material may be involved in, which reaction(s) lead to altering the physical and/or chemical properties of material in a way that leads to the activation of the compressed gas release system of the present invention, according to the principles described hereinabove.

According to the present invention, the gas source may acquire different sizes and shapes and may contain any one of many types of internal mechanism for gas release, operated by pressing them inwardly or sideways relative to the canister, as many commercially available gas canisters does. In these cases the gas releasing end of the firing pin is selected to be large (e.g., having a wide cross section, substantially flat, not-pointed, not-sharp) enough as to push the gas canister or a part of it, rather than to puncture it, whereas in a case where the gas source is devoid of an internal gas release mechanism the gas releasing end of the firing pin is selected to be sharp or pointed so as to release the content of the gas source by puncturing it. Another possibility is that a large gas releasing end of the firing pin is selected and operates to release gas from the gas source by pushing the gas source against a sharp or pointed member aimed at puncturing the gas source, thereby to release the gas.

While the invention has been described with respect to a limited number of embodiments, it will be appreciated that many variations, modifications and other applications of the invention may be made.

What is claimed is:

1. A compressed gas release system operating under a combination of a predetermined threshold external pressure and a defined chemical environment, comprising:

(a) a housing defining a space;

(b) a material contained in part of said space, said material being a solid in a first chemical environment and dissolving in a second chemical environment;

(c) a biasing member activated when pressed against said material when said material is solid, said biasing member being relaxed when said material dissolves;

(d) a firing pin including a gas releasing end, said firing pin being fired when said biasing member is relaxed;

(e) a source of compressed gas, said source of compressed gas releasing a gas when said firing pin is fired;

(f) a diaphragm having an internal side and an external side, said diaphragm being mounted onto said housing, said internal side of said diaphragm facing said space of said housing, thereby sealing said first chemical environment in said space;

(g) a diaphragm puncturing device mounted in said space of said housing;

(h) a pressure responding means in said space of said housing, said pressure responding means keeping said internal side of said diaphragm away from said diaphragm puncturing device when the external pressure is below the threshold and, said diaphragm being punctured by said diaphragm puncturing device when the external pressure is above the threshold;

said housing, said space, said biasing member, said material, said pressure responding means, said firing pin, said gas releasing end, said diaphragm and said diaphragm puncturing device being arranged so that when said diaphragm is punctured by said diaphragm puncturing device, said space is exposed to said second chemical environment, said material dissolves, said biasing member is relaxed, said firing pin is fired along with said gas releasing end and, as a result, said gas is released from said source of compressed gas.

2. A compressed gas release system as in claim 1, wherein said pressure responding means is selected from the group of means consisting of a biasing device, an internal pressure within said housing and a combination of a biasing device and an internal pressure within said housing.

3. A compressed gas release system as in claim 2, wherein said biasing device is a first spring.

4. A compressed gas release system as in claim 1, wherein said biasing member is a second spring.

5. A compressed gas release system as in claim 1, wherein said pressure responding means is a first spring and said biasing member is a second spring.

6. A compressed gas release system as in claim 1, further comprising a gas bag, said gas bag being in communication with said gas source under said combination of threshold pressure and chemical environment.

7. A compressed gas release system as in claim 6, wherein said gas bag further includes a first group of chemiluminescent materials and said gas source includes a second group of chemiluminescent materials, said first and second groups of chemiluminescent materials being mixed under said combination of threshold pressure and chemical environment.

8. A compressed gas release system as in claim 6, wherein said gas bag is for floating a person above water.

9. A compressed gas release system as in claim 6, wherein said gas operates a valve operating device, said valve operating device closing a valve located in an inlet of a tank.

10. A compressed gas release system as in claim 1, wherein said biasing member surrounds at least a part of said firing pin.

11. A compressed gas release system as in claim 1, wherein said biasing member is external to said firing pin.

12. A compressed gas release system as in claim 1, wherein said gas is selected from the group consisting of air, nitrogen, oxygen, freon, carbon dioxide, helium, nitrous oxide, propane, sulfur hexafluoride and, any combinations of air, nitrogen, oxygen, freon, carbon dioxide, helium, nitrous oxide, propane and sulfur hexafluoride.

13. A compressed gas release system as in claim 1, wherein said gas is in a liquid form when is in said gas source.

14. A compressed gas release system as in claim 1, wherein said diaphragm is made of a material selected from the group of materials consisting of rubber, plastic, silicone, synthetic polymers, natural polymers and, any combination of rubber, plastic, silicone, synthetic polymers and natural polymers.

15. A compressed gas release system as in claim 1, further comprising a cover, said cover including holes and said cover protecting said diaphragm.

16. A compressed gas release system as in claim 1, wherein said biasing member is embedded in said material.

17. A compressed gas release system as in claim 2, wherein said internal pressure within said housing is programmable.

18. A compressed gas release system as in claim 1, wherein said diaphragm puncturing device is movable relative to said internal side of said diaphragm.

19. A compressed gas release system as in claim 1, further comprising a handle connected to the system for manual operation of the system.

20. A compressed gas release system as in claim 1, wherein said material is selected from the group of materials consisting of gypsum, salt, clay, and any combination of gypsum, salt and clay.

21. A compressed gas release system as in claim 1, wherein said gas releasing end of said firing pin is selected from the group consisting of a pointed gas releasing end, a sharp gas releasing end and a large gas releasing end.

22. A compressed gas release system as in claim 2, further comprising a gas bag, said gas bag being in communication with said gas source under said combination of threshold pressure and chemical environment.

23. A compressed gas release system as in claim 22, wherein said gas bag further includes a first group of chemiluminescent materials and said gas source includes a second group of chemiluminescent materials, said first and second groups of chemiluminescent materials being mixed under said combination of threshold pressure and chemical environment.

24. A compressed gas release system as in claim 22, wherein said gas bag is for floating a person above water.

25. A compressed gas release system as in claim 22, wherein said gas operates a valve operating device, said valve operating device closing a valve located in an inlet of a tank.

26. A compressed gas release system as in claim 2, wherein said biasing member surrounds at least a part of said firing pin.

27. A compressed gas release system as in claim 2, wherein said biasing member is external to said firing pin.

28. A compressed gas release system as in claim 2, wherein said gas is selected from the group consisting of air, nitrogen, oxygen, freon, carbon dioxide, helium, nitrous oxide, propane, sulfur hexafluoride and, any combinations of air, nitrogen, oxygen, freon, carbon dioxide, helium, nitrous oxide, propane and sulfur hexafluoride.

29. A compressed gas release system as in claim 2, wherein said gas is in a liquid form when is in said gas source.

30. A compressed gas release system as in claim 2, wherein said diaphragm is made of a material selected from the group of materials consisting of rubber, plastic, silicone, synthetic polymers, natural polymers and, any combination of rubber, plastic, silicone, synthetic polymers and natural polymers.

31. A compressed gas release system as in claim 2, further comprising a cover, said cover including holes and said cover protecting said diaphragm.

32. A compressed gas release system as in claim 2, wherein said biasing member is embedded in said material.

33. A compressed gas release system as in claim 2, wherein said diaphragm puncturing device is movable relative to said internal side of said diaphragm.

34. A compressed gas release system as in claim 2, further comprising a handle connected to the system for manual operation of the system.

35. A compressed gas release system as in claim 2, wherein said material is selected from the group of materials consisting of gypsum, salt, clay, and any combination of gypsum, salt and clay.

36. A compressed gas release system as in claim 2, wherein said gas releasing end of said firing pin is selected from the group consisting of a pointed gas releasing end, a sharp gas releasing end and a large gas releasing end.

* * * * *